United States Patent [19]

Frazer

[11] Patent Number: 4,658,099

[45] Date of Patent: Apr. 14, 1987

[54] APPARATUS AND METHOD FOR REMOTELY DETERMINING THE PRESENCE OF UNAUTHORIZED SURVEILLANCE DEVICES ON A COMMUNICATIONS LINE

[75] Inventor: Byron T. Frazer, Boise, Id.

[73] Assignee: Security Call, Inc., Boise, Id.

[21] Appl. No.: 809,170

[22] Filed: Dec. 16, 1985

[51] Int. Cl.$^4$ .............................................. H04B 3/46
[52] U.S. Cl. .......................................... 379/7; 379/26
[58] Field of Search ............ 179/175.3 R, 81 E, 99 E, 179/175.2 D, 175.3 F, 175.2 C, 175

[56] References Cited

U.S. PATENT DOCUMENTS 4,186,282  1/1980  Ellson ........................... 179/175.3 R
4,218,592  8/1980  Steinbergs et al. .......... 179/175.2 D Primary Examiner—Stafford D. Schreyer
Attorney, Agent, or Firm—Cushman, Darby & Cushman

[57] ABSTRACT

Method and apparatus for detecting whether or not an unauthorized surveillance device has been installed on a communications line between user terminal equipment and central switching station equipment. Apparatus is installed at the central switching station and receives a test request signal from the user terminal equipment, such as a telephone. A receiving device receives the remotely generated test signal and activates the test. A measuring device then measures electrical characteristics of the communications line to determine the presence or absence of the "bug". The measuring device provides output signals indicative of the security status of the line. A signalling device responds to the output signals and provides a status signal to the user terminal equipment through the communications line. The status signal indicates the security status of the communications line.

19 Claims, 9 Drawing Figures

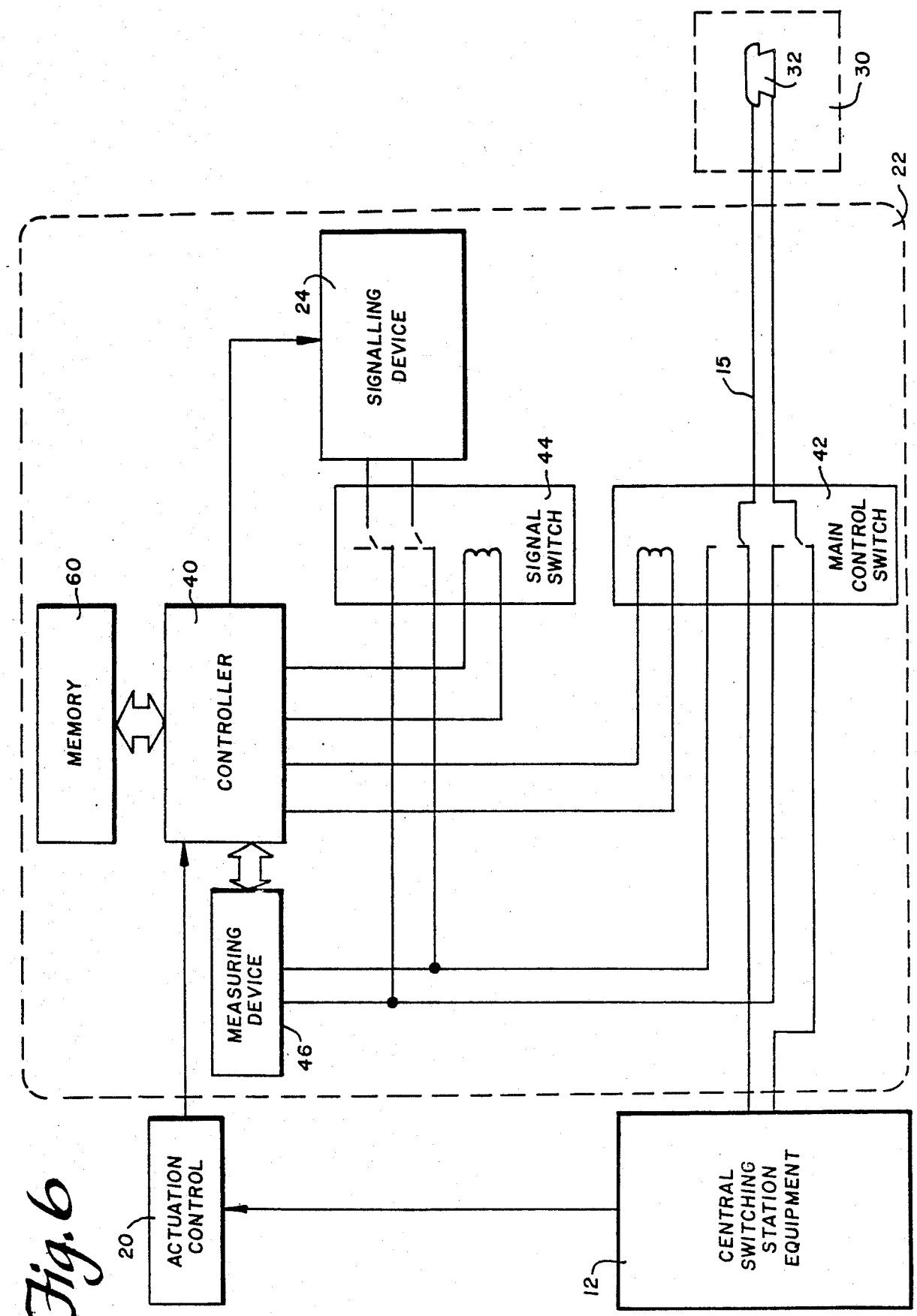

APPARATUS AND METHOD FOR REMOTELY DETERMINING THE PRESENCE OF UNAUTHORIZED SURVEILLANCE DEVICES ON A COMMUNICATIONS LINE

BACKGROUND OF THE INVENTION

This invention relates to the field of detecting unauthorized "bugs" on telephone lines. More particularly, this invention relates to apparatus and method for remotely determining the presence of an unauthorized surveillance device installed on a communications line between user terminal equipment and a central communications exchange station. Those having skill in the communications field will recognize that the teachings of this application may be adapted to any system for measuring desired parametric values in a communications loops. Such measurements may include the capacity of a line to handle data, the capability of a line to perform multi-channel communications, the ability of a communications loop to carry digital and/or analog signals, etc.

As sophistication in electronics increases, security threats to land-line communications multiply. Many devices have been designed to protect land-line communications security, and an entire industry has been built around such communications security. Most known devices are concerned with detecting surveillance devices attached to a telephone, or surveillance devices installed in a central telephone exchange station.

For example, U.S. Pat. No. 4,218,592 to Steinbergs et al discloses a communications security device which detects whether a telephone has been wired as a hidden listening device. This apparatus is meant to detect any devices which may convert a hung-up telephone into an active listening device.

Also known are "scrambler" devices which may be connected to a telephone and scramble the voice of a user in accordance with a given code. A receiver having a "descrambler" device provided with the same code may receive the scrambled signal and convert it to normal voice communications.

While much attention has been focused on providing security at the transmission and the reception ends of a telephone communication, little consideration has been given to protecting the telephone line between the transmitting and receiving devices. Yet, a well designed security system must ensure the security integrity of the telephone line as well as the transmitter and receiver.

One solution for ensuring the security of the telephone line is to provide "dedicated" lines which are ostensibly not subject to being "bugged". However, such "dedicated" telephone lines are very expensive to install and maintain, and must be continually guarded.

Also known are devices for checking fault conditions in a telephone line between a central telephone exchange station and a point in the telephone line between the exchange station and the user telephone. For example, U.S. Pat. No. 4,415,779 to Bowman discloses a method and apparatus for testing a telephone line to locate a fault with reference to a regulator box attached on the outside of the house of the telephone user. Bowman is concerned with determining whether a fault in the telephone line is located between the regulator box and the telephone company's switching station. Bowman teaches that one method for checking telephone line faults is to mechanically disconnect the telephone line at the regulator box and reconnect it to a termination network of known impedance. The known impedance is then measured in response to a test signal sent from a central office. If the measurement agrees with the known impedance, no fault lies between the regulator box and the central office.

Bowman provides a maintenance termination unit which is permanently installed next to the regulator box on the outside of the subscriber's home. During normal usage, the maintenance termination unit is transparent to the telephone user. In the test mode, a high voltage, continuous, unidirectional current is applied from the central office. In response to the signal, the maintenance termination unit determines whether there is a fault in the telephone line between the central office and the regulator box. However, Bowman is concerned with fault location and not with "bug" detection. Thus, while Bowman may be capable of detecting faults, he is not capable of determining the presence of sophisticated electronics eavesdropping equipment. Furthermore, Bowman is incapable of detecting a fault in the telephone line between the regulator box and the user's telephone inside his home. It is known that many eavesdropping devices are installed between the regulator box and the user's telephone. In addition, Bowman requires a maintenance termination unit to be located on the outside of the subscriber's home, next to the regulator box. In this location, the maintenance termination unit is highly susceptible to being tampered with, damaged, or otherwise circumvented.

Another example of a line testing device is disclosed in U.S. Pat. No. 4,413,163 Basini. Basini discloses a portable line tester for a telephone system. The portable line tester is carried by an operator to a location from which the test is to be conducted. For example, the line tester is taken to a location where a line fault is suspected. The portable line tester is attached to the telephone lines and then "calls" a generator installed at the central switching station. The generator responds by sending a pilot tone to the portable line tester. The portable line tester then measures the received pilot tone to determine the attenuation of the signal between the central switching station and the portable line tester unit. As in Bowman, Basini is incapable of determining the presence of a "bug" installed on the telephone line anywhere from the central switching station up to the user's telephone. Furthermore, Basini requires an operator to be dispatched to the location at which the line test is to be conducted.

Other known line test systems for detecting the presence of a line fault in telephone lines are disclosed in U.S. Pat. No. 4,388,501 to Ahuja, U.S. Pat. No. 4,446,340 to Fryer, U.S. Pat. No. 4,350,849 to Ahuja, and U.S. Pat. No. 4,524,321 Jablway et al. Like the above-discussed patents, these systems describe the use of scanners, central office and/or subscriber located devices, and other equipment which establish the existence of line faults, opens, shorts, and reversals along a telephone line. None of these patents addresses the detection of unauthorized surveillance devices installed on the telephone line.

Thus, there is an apparent need for a system which detects the presence of a surveillance device on a telephone line from a location remote from the "bug". Such a system should be easily installed, easy to maintain, and should not require an operator to be dispatched to conduct the "bug" checks.

SUMMARY OF THE INVENTION

The present invention provides apparatus and method for remotely determining the presence of unauthorized surveillance devices installed on a telephone line. Apparatus is installed at a telephone central switching station and is capable of being connected to any telephone lines which are to be checked. A telephone user desiring to perform a security check on his telephone line simply calls the telephone switching station and provides a signal to the apparatus located therein. The apparatus responds to the signal by disconnecting the user's telephone line from the switching station and reconnecting the line to a measuring device within the apparatus. The measuring device then measures electrical characteristics on the telephone line to determine the presence or absence of surveillance devices on the line.

In a first aspect of the invention, additional circuitry is located at the user's telephone. Upon receiving the request signal, the apparatus at the central switching station returns an off-load signal to the user's telephone. The circuitry on the user's telephone responds to this signal by off-loading the user's telephone line at the telephone. The apparatus then measures the electrical characteristics (for example impedance) of the off-loaded telephone line. The presence of any surveillance devices attached to the telephone line then will be readily detectable. After performing the "bug" check, the circuitry at the user's telephone then reconnects the telephone to the telephone line. Then, the apparatus at the central switching station provides a signal to the user's telephone indicating the security status of the telephone line. Thus, the security check can be initiated at a remote location by a user without the intervention of additional test personnel, and without the necessity of checking the line at points between the telephone and the central switching station.

In a second aspect of the invention, additional circuitry at the user's telephone is not required. Instead, the apparatus at the central switching station includes a memory containing calibrated data about the electrical characteristics of the telephone line between the central switching station and the user's telephone. In such a system, the electrical characteristics of the telephone line between the central switching station and the user's telephone are established at periods of known "bug-free" operation. Thus, a library of "safe" electrical characteristics are stored at the central switching station. To perform a "bug" check, the user merely sends a signal from his telephone to the apparatus at the central switching station. The apparatus then monitors the telephone line and measures the electrical characteristics thereof. The measured electrical characteristics are then compared with the stored electrical characteristics and the presence of newly-installed surveillance devices is readily detectable. At the completion of the test, the apparatus at the central switching station sends a signal to the user's telephone indicating the results of the security check. Again, this aspect is user-initiated and requires no intervention by other personnel, nor the necessity of checking the telephone line at intermediate points.

Thus, a simple and cost-effective method and apparatus is provided for determining the presence of unauthorized surveillance devices at any point on a telephone line between a telephone central switching station and a user's telephone. However, it is to be understood that the teachings of this application are also applicable to the measurement of other non-fault conditions in a communications loop. Thus, the provision of a different measuring device may enable this system to perform parametric measurement of line quality, data handling capacity, etc.

BRIEF DESCRIPTION OF THE DRAWINGS

The advantages, structure, and method of the present invention will become more apparent when taken together with the following detailed description of the presently preferred exemplary embodiment, together with the drawings which show:

FIG. 6 shows a schematic diagram of a second embodiment of the apparatus according to the present invention.

DETAILED DESCRIPTION OF THE PRESENTLY PREFERRED EXEMPLARY EMBODIMENT

The apparatus according to the presently preferred exemplary embodiment of the invention is installed in a central telephone switching station and will detect the presence of an unauthorized surveillance device on a communications line between the central switching station and user terminal equipment.

Figure 1:
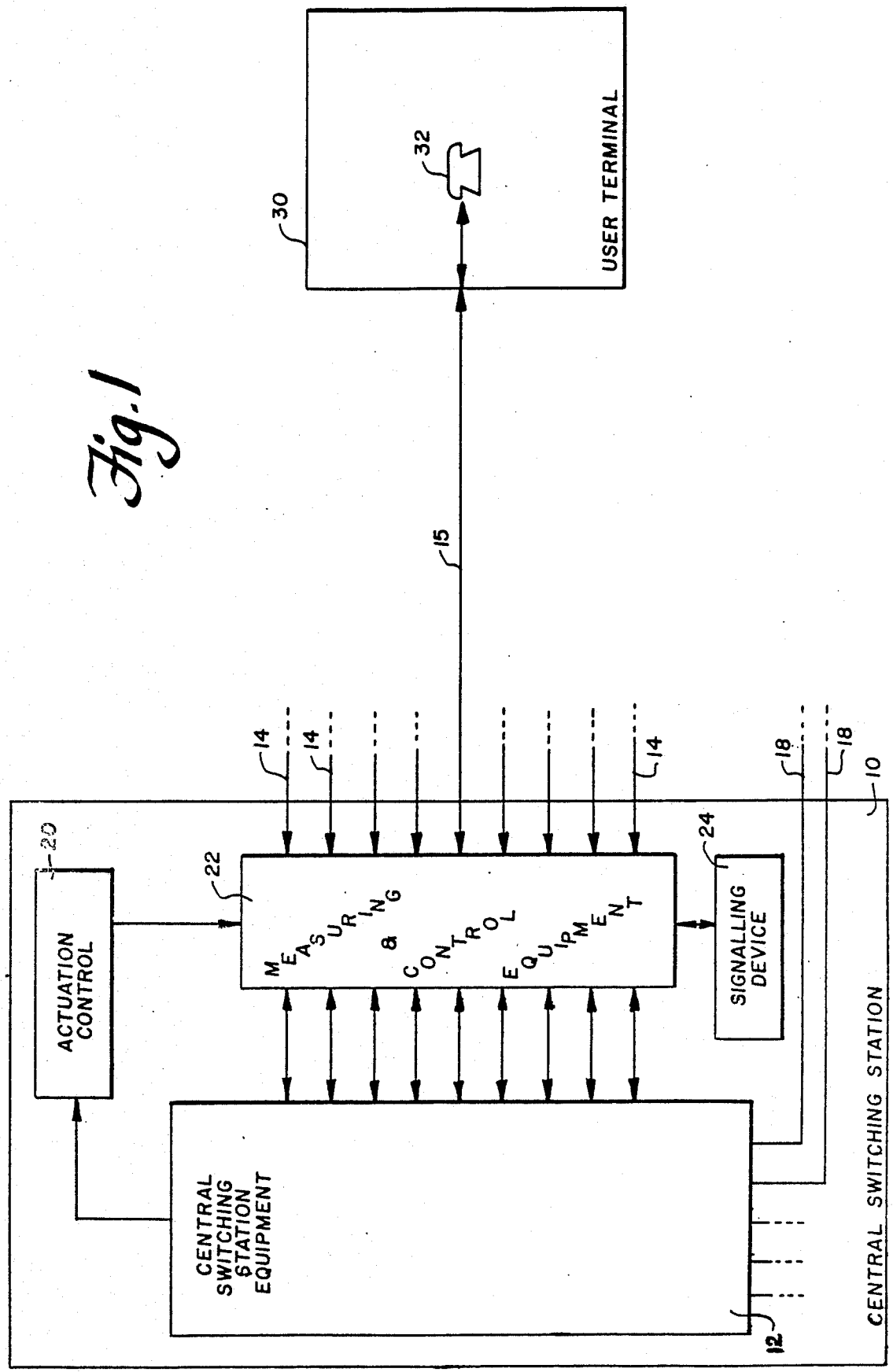
FIG. 1 shows a block diagram of the apparatus according to the present invention.

Referring to FIG. 1, a block diagram of the apparatus according to the present invention will now be described. Central switching station 10 is a central exchange station for telephone lines. Such known central switching stations include central switching equipment 12 which connects together a plurality of communications lines 14, and routes messages to and from said communications lines. The apparatus according to the present invention is installed in central switching station 10 and is coupled to central switching station equipment 12. The apparatus according to the present invention includes actuation control 20, measuring and control equipment 22, and signal device 24. Measuring and control equipment 22 is coupled between central switching station equipment 12 and communications lines 14 and 15. If desired, communications lines 18 need not be coupled to measuring and control equipment 22.

Measuring and control equipment 22 is capable of measuring the presence or absence of unauthorized surveillance devices on communications lines 14 and 15, as described below.

Actuation control 20 is coupled to central switching station equipment 12 and measuring and control equipment 22 and activates the testing of communications lines 14 and 15. Signalling device 24 is coupled to measuring and control equipment 22 and provides appropriate acknowledgment and status signals to the user, as described below.

To initiate a test to determine whether a "bug" is installed on communications line 15, a user provides an actuation signal to the central switching station equipment 12. The actuation control signal may be provided by the user from user terminal 30 via telephone 32. However, the actuation control signal may be provided through any of communications line 14 or 18. Such an actuation control signal may include the dialing of a special telephone number, providing special tones from a touch-tone telephone, or providing other telephone-activated signals which command actuation control 20 to begin a test. In addition, those having ordinary skill in this field will understand that many methods may be provided to remotely stimulate actuation control 20, such as radio-frequency signals, optical-coupled signals, mechanical means, or any other method from which a request from a remote station may be channeled to actuation control 20.

Once actuation control 20 has received the actuation control signal, it provides an activation signal to measuring and control equipment 22. Measuring and control equipment 22 then causes signalling device 24 to provide a signal to communications line 15 indicating that a request for test on communications line 15 has been received and the test has been initiated. Thus, a user at telephone 32 would be apprised of the fact that a security check was being performed on his telephone line.

After the acknowledgment signal has been provided on communications line 15, measuring and control equipment 22 proceeds to measure certain electrical parameters of communications line 15 to detect the presence of a "bug" on communications line 15. These measurements and tests will be described in more detail below.

Upon completion of the test, measuring and control equipment 22 commands signalling device 24 to provide a status signal to communications line 15. The status signal indicates whether or not a "bug" has been installed on communications line 15. Thus, a user at telephone 32 is apprised of whether communications line 15 is "clear" or "not clear". Upon receiving the status signal, a user at telephone 32 then may proceed to engage in a secure communications, or may initiate steps to remove the "bug" from communications line 15.

Those having skill in this field will recognize that many alternatives to the above-described system may be adopted without departing from the teachings of this application. For example, signalling device 24 may provide acknowledgment and status signals on telephone lines other than line 15. Furthermore, the signalling device 24 may provide acknowledgment and status signals in the form of radio frequency signals, optical signals, or mechanical flags designed to apprise a remote user of the security status of his communications line. Furthermore, as may be readily understood, the apparatus according to the present invention may be installed in a private branch exchange (PBX) to test the security of a telephone line between the PBX and a user telephone. Alternatively, the apparatus according to the present invention may be installed in a central telephone central station and then the line test can be routed through a PBX to a private phone. Thus, the apparatus according to the present invention may be installed at any communications line switching station from which a security check to a particular phone is desired. Thus, the present invention should be understood as teaching a method and apparatus for providing a security check to a communications line anywhere between a user's telephone and a designated telephone line switching station.

Figure 2:
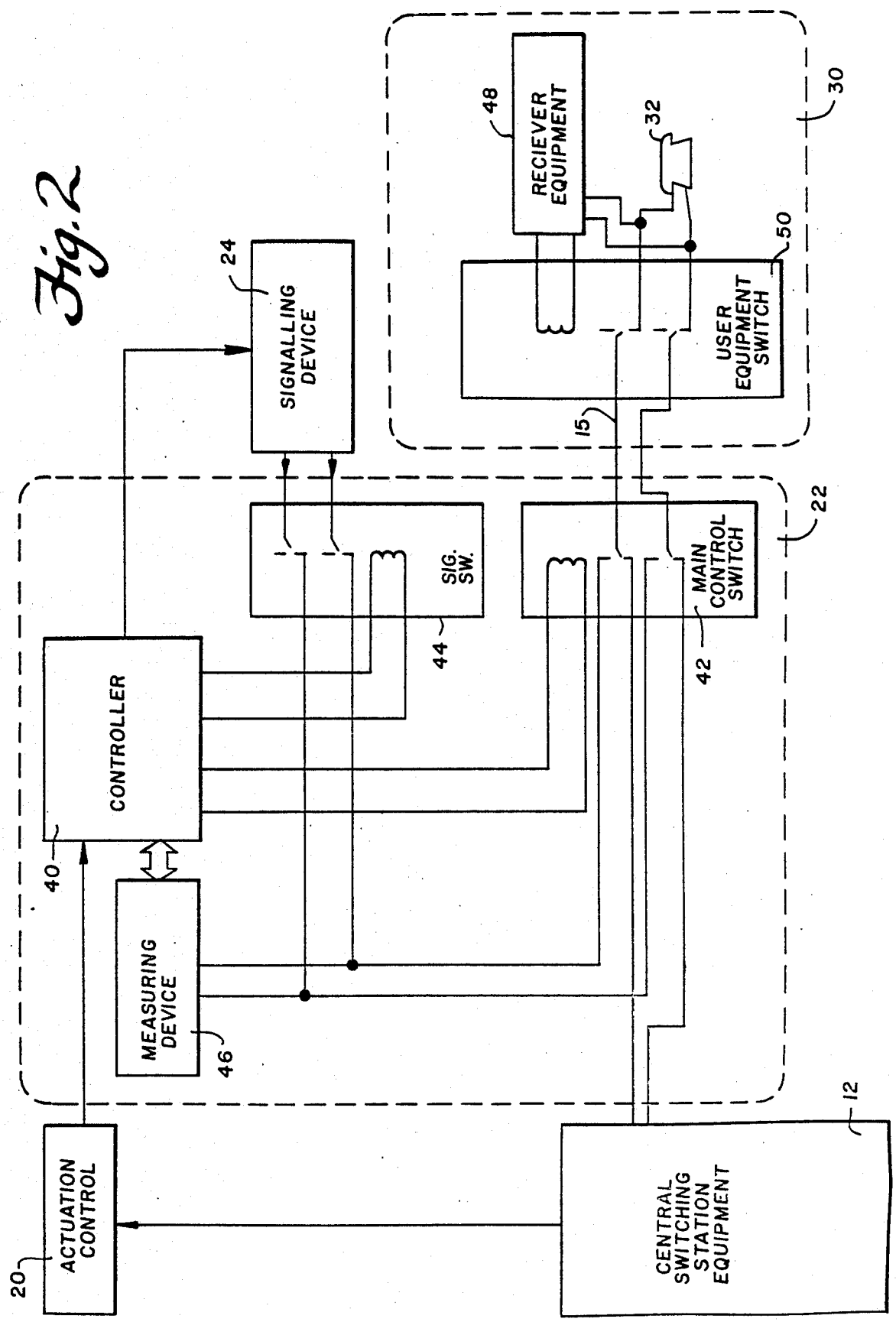
FIG. 2 shows a schematic diagram of a first embodiment of the apparatus according to the present invention.

Referring now to FIG. 2, a description of a first embodiment of the apparatus according to the present invention will now be given. In this embodiment, circuitry is provided at the user terminal 30 and is adapted to be connected to user equipment 32 (for example a telephone). This embodiment operates by off-loading the user equipment 32 and then measuring the electrical characteristics (impedance) of the off-loaded communications line 15.

Measuring and control device 22 is seen as including controller 40, main control switch 42, signal switch 44, and measuring device 46. Upon receipt of the actuation control signal (for example from central switching station equipment 12), actuation control 20 provides the activation control signal to controller 40. Controller 40 then synchronizes the operations of main control switch 42, signal switch 44, signalling device 24, and measuring device 46 to detect the presence of an unauthorized surveillance device on communications line 15 between the central switching station and user terminal 30.

Controller 40 is a processor containing a memory, a central processing unit, and may for example be a microprocessor. Controller 40 synchronizes the operation of the above-mentioned devices in accordance with software stored inside controller 40. Such software control may be accomplished by means of a program such as that depicted in FIG. 3.

Figure 3A:
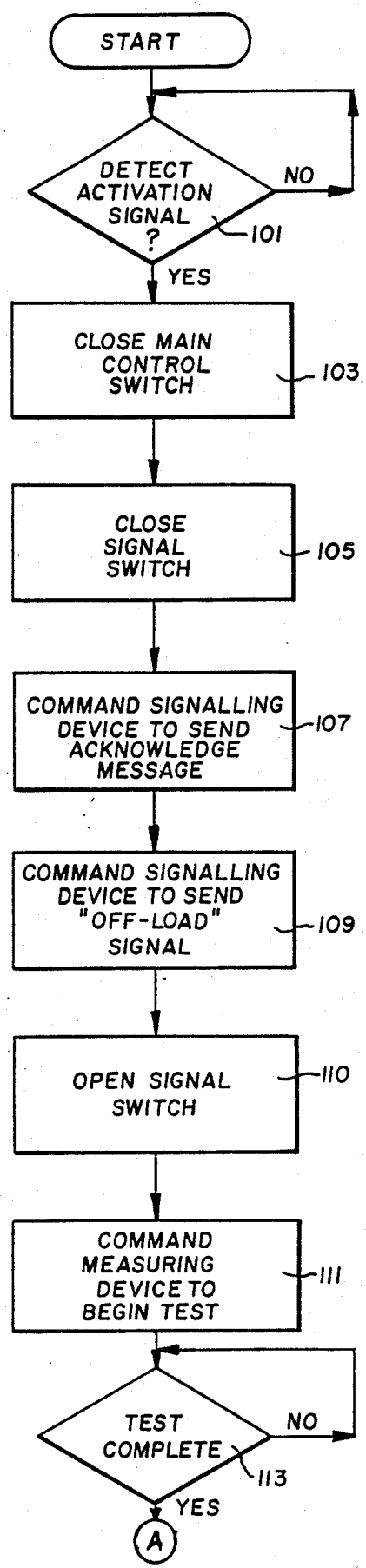
FIGS. 3a and b are software flow chart of a method according to the first embodiment of the present invention.
Figure 3B:
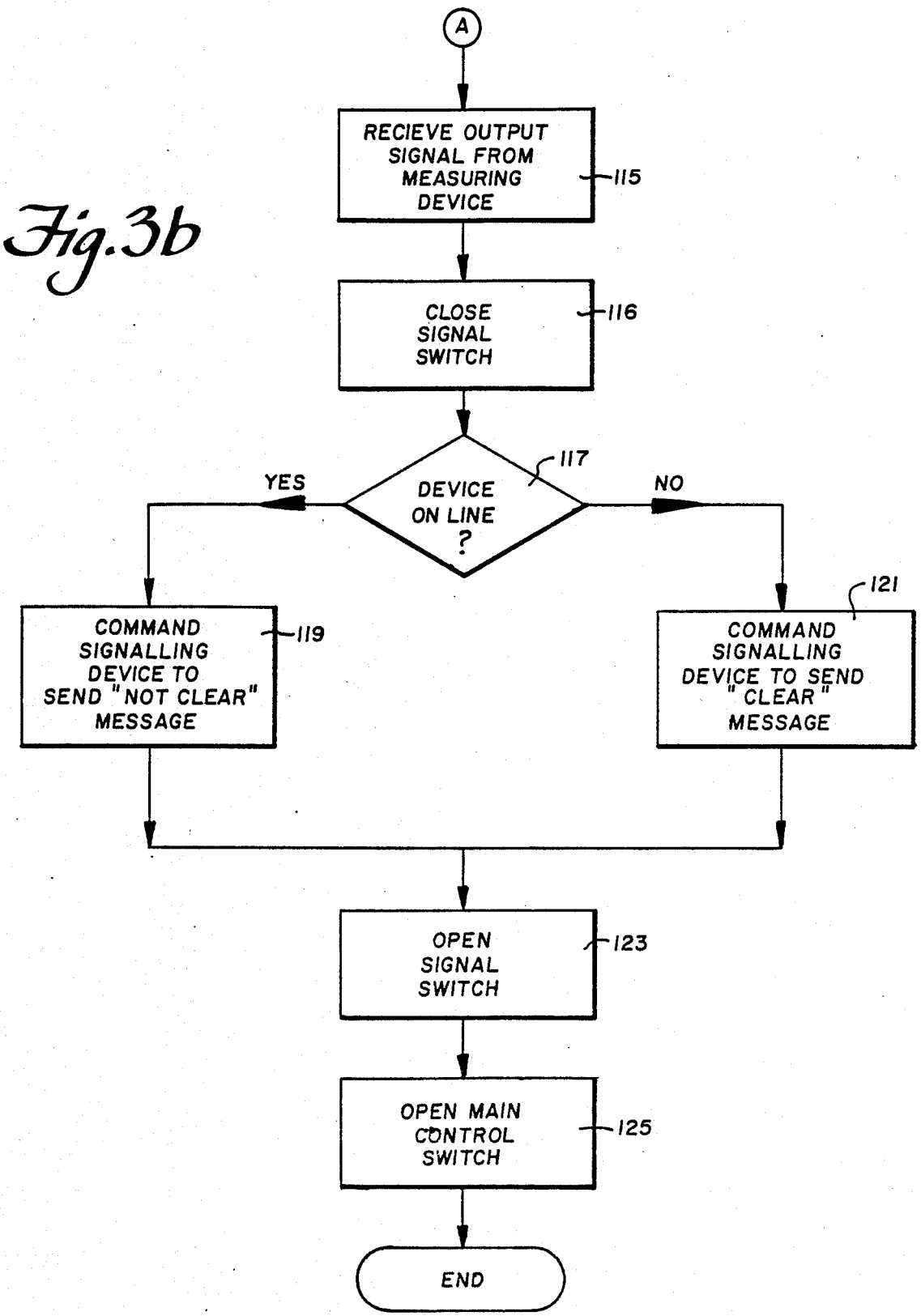

Referring now simultaneously to FIGS. 2 and 3, the operation of the first embodiment of the present invention will now be described. When controller 40 receives the activation signal at step 101, it closes the main control switch 42 at step 103. When main control switch 42 is closed, this disconnects communications line 15 from central switching station equipment 12, and couples the communications line to measuring device 46 and signalling device 24.

Then, controller 40 closes signal switch 44, as indicated at step 105. When signal switch 44 is closed, this couples signalling device 24 to communications line 15 through main control switch 42. Next, at step 107, controller 40 commands signalling device 24 to provide an acknowledge signal to communications line 15. Thus, a user operating user equipment 32 may receive a signal acknowledging that his request for a security test has been received, and that the test has been initiated.

Then, controller 40 performs step 109 and commands signalling device 24 to send an "off-load" signal to user terminal 30.

This "off-load" signal is received by receiver equipment 48 which acts to shed the load on communications line 15 at user terminal 30. Receiver equipment 48 then acts in accordance with a stored software program to be described later, and activates user equipment switch 50 to disconnect user equipment 32 from communications line 15. In the thus off-loaded state, measurements of communications line 15 to detect the presence of a "bug" will be made more accurate.

Once user equipment 32 is off-loaded from communications line 15, controller 40 opens signal switch 44 at step 110. Then, controller 40 sends an initiation signal to measuring device 46 to command it to begin the security test at step 111. At step 113, controller 40 determines whether the security test conducted by measuring device 46 has been completed. When the security test is complete, controller 40 receives output signals from measuring device 46, at step 115. The controller then closes signal switch 44 at step 116.

Controller 40 then interprets the output signals from measuring device 46 to determine whether an unauthorized surveillance device has been installed on communications line 15, at step 117. This may be accomplished by comparing the measurements with data acquired earlier under controlled conditions. This earlier-acquired data may be stored in a memory inside controller 40, or provided as a constant reference threshold. Thus, a memory may or may not be required. If a "bug" has been detected on the line, controller 40 commands signalling device 24 to send a "not clear" message to communications line 15, at step 119. In the meantime, receiver equipment 48 has controlled user equipment switch 50 to reconnect communications line 15 to user equipment 32. Thus, a user monitoring user equipment 32 receives the "not clear" signal indicating the presence of a "bug" on communications line 15.

If no surveillance device has been detected on communications line 15 at step 117, controller 40 commands signalling device 24 to send a "clear" message to the user through communications line 15 and user equipment 32, as depicted at step 121.

The "not clear" and "clear" messages may be any easily recognizable indication of the security status of the line. For example, these messages may be tones, bells, or recorded messages clearly describing the security status of the line. Moreover, these messages may include information as to what type of "bug" has been installed on the line, when it was installed, or where the "bug" has been placed. These messages may contain any other information within the capabilities of measuring device 46 to detect.

After the "not clear/clear" signals have been provided to the user, controller 40 opens signal switch 44 to de-couple signalling device 44 from communications line 15, at step 123. This is followed by step 125 in which controller 40 opens main control switch 42 to reconnect communications line 15 to central switching station equipment 12.

Thus, the security status of communications line 15 has been remotely determined by decoupling the line at user equipment switch 50 and at main control switch 42 and by measuring the thus decoupled line via measuring device 46. Those having ordinary skill in this field will understand that other alternatives and adaptations of the above-described apparatus and method may be designed and implemented without departing from the teachings of this application. For example it may be possible to detect the "bug" without decoupling the line from central switching station equipment 12.

Measuring device 46 must be capable of determining the presence of a surveillance device on communications line 15. Measuring device 46 can perform this through any number of known "bug-detecting" processes and apparatuses. For example, measuring device 46 can detect the impedance on the off-loaded communications line 15. Alternatively or in conjunction with an impedance test, measuring device 46 can provide a resistance test, a capacitance test, a reactance test, or other appropriate tests.

Alternatively, measuring device 46 can detect the presence of surveillance devices on communications line 15, without requiring communications line 15 to be off-loaded at user terminal 30. In such a case, measuring device 46 can determine the presence of "bugs" through a line voltage test, a current test, a tone sweep test, a line listen test, a DC high voltage test, or a very high voltage test. These and other tests are known to those of skill in this field and may be accomplished with devices such as Model CCTA 1000 telephone scanner made by CCS Communication Control Inc. This device may be coupled with a MLJ-101 multi-line coupling control unit also produced by CCS Communication Control Inc. Other known devices can perform other tests such as the time domain reflectometer test, performed in conjunction with the TA 5000 telephone analyzer manufactured by CCS Communication Control Inc. Thus, measuring device 46 can be a conventional "bug detecting" device or may, alternatively, be a device especially designed for a given security environment.

Those having skill in this field will understand that a judicious choice of the measuring device will allow this system to detect and measure other non-fault conditions on the communications line. For example, the measuring device may guage the ability of the line to handle voice and/or data, line transmission capacity, etc.

Figure 4:
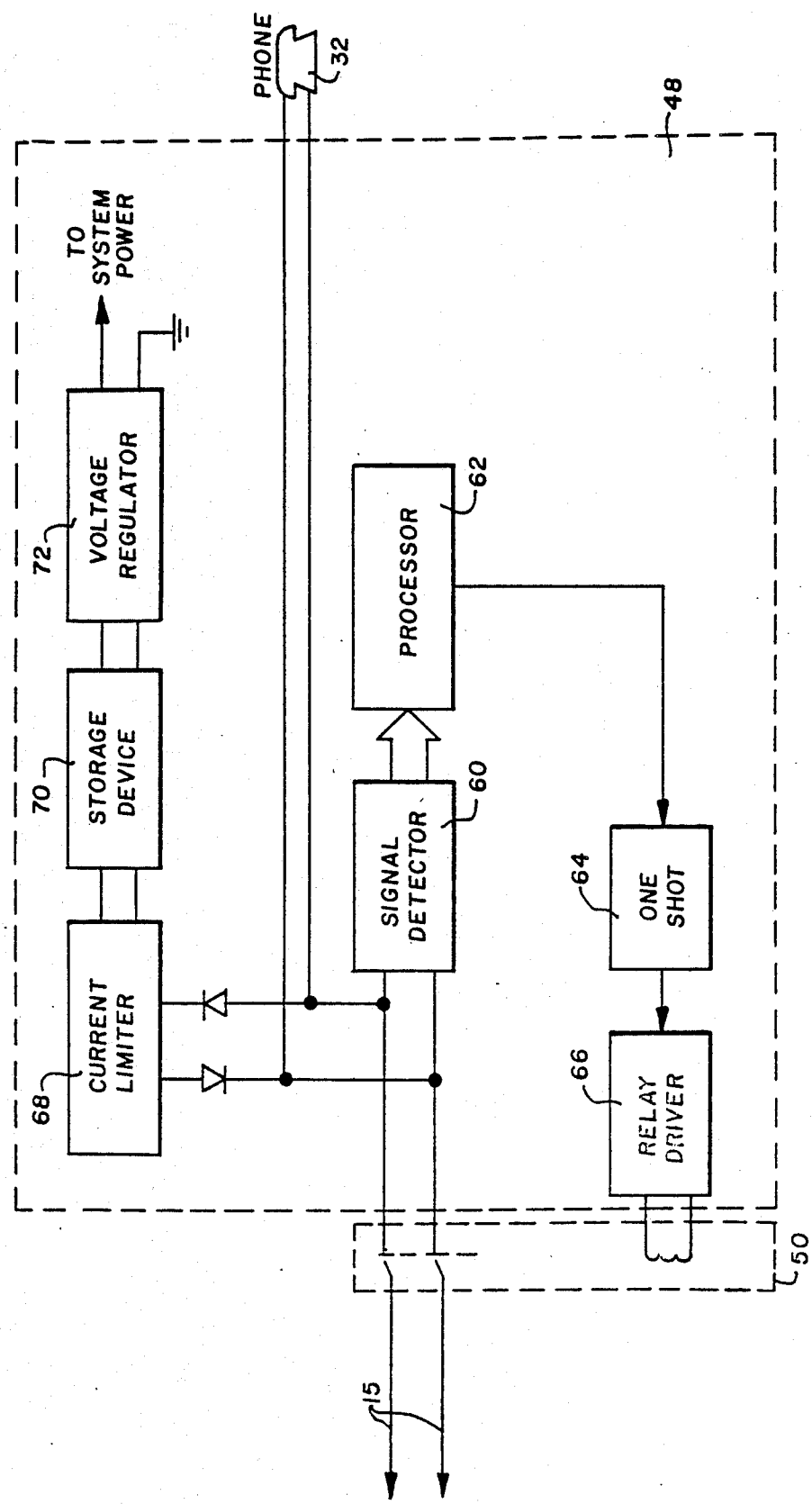
FIG. 4 shows a schematic diagram of the receiver equipment used in conjunction with the first embodiment of the apparatus according to the present invention.

Turning now to FIG. 4, a more detailed description of receiver equipment 48 will be provided. Receiver equipment 48 is coupled to user equipment 32, and to communications line 15 through user equipment switch 50. Receiver equipment 48 includes a signal detector 60, a processor 62, a one-shot 64, a relay driver 66, current limiter 68, storage device 70, and voltage regulator 72.

Figure 5:
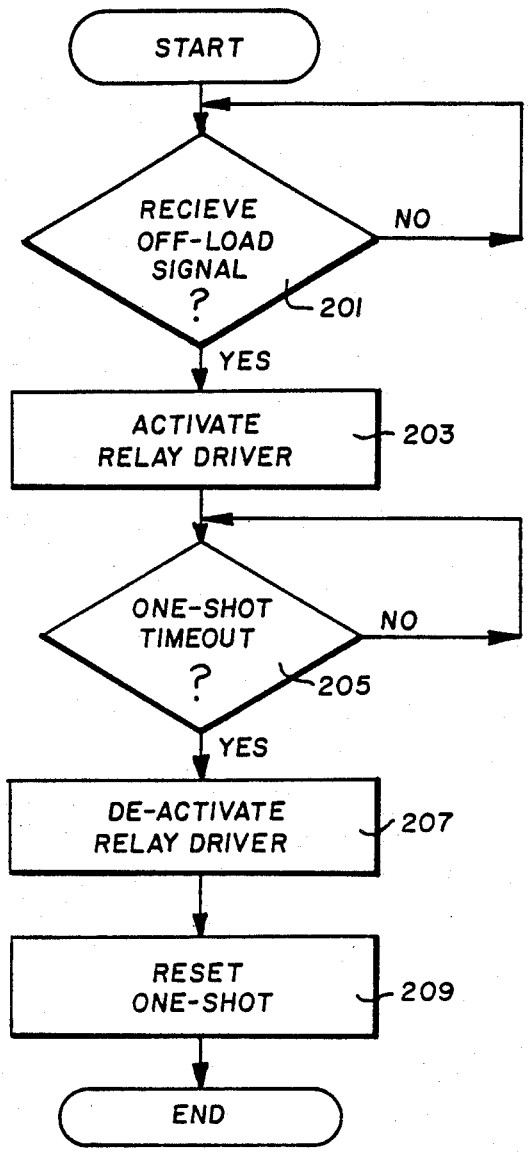
FIG. 5 shows a software flow chart of the receiver equipment used with the first embodiment according to the present invention.

Signal detector 60 detects the off-load signal provided through communications line 15 by signalling device 24. Once signal detector 60 has determined that the proper off-load signal has been received, it provides a signal to processor 62. Processor 62 then activates one-shot 64, and relay driver 66, in accordance with a software program stored in processor 62. Such a software program may be as depicted in FIG. 5. Once processor 62 receives the off-load signal indication from signal detector 60 (at step 201 of FIG. 5), processor 62 activates relay driver 66 through one-shot 64, at step 203. Relay driver 66 then activates user equipment switch 50 to off-load user equipment 32 from communications line 15. At step 205, processor 62 waits for one-shot 64 to time out. Upon completion of the time out, processor 62 deactivates the relay driver 66, at step 207. Then, processor 62 resets one-shot 64 at step 209 when the security test is complete.

Current limiter 68, storage device 70, and voltage regulator 72 provide power for the system. Current limiter 68 trickle-charges storage device 70 without exceeding maximum allowable drain on the D.C. phone line power. Current limiter 68 thus protects receiver equipment 48 during a high voltage D.C. ring. Storage device 70 provides power to the system during preset disconnect times. Voltage regulator 72 converts raw power from storage device 70 to a power level compatible with the system.

Those having skill in this field will understand that the apparatus according to FIG. 4 is not unique. For example one-shot 64 may be incorporated into the processor functions of processor 62. System power may also be provided by a battery or A.C. power provided at the user terminal 30. Furthermore, processor 62 may be configured to receive and store "not clear/clear" signals from signalling device 24. Thus, a record of communications checks and their results may be maintained within receiver equipment 48.

A second embodiment of the apparatus according to the present invention will now be described in connection with FIGS. 6 and 7. In this embodiment, measuring and control device 22 includes a memory 60, as well as controller 40, main control switch 42, signal switch 44, and measuring device 46. Memory 60 may be incorporated into a processor embodying controller 40, or, memory 60 may be provided external to controller 40.

This second embodiment operates somewhat similar to the first embodiment described above, except no receiver equipment needs to be provided at user terminal 30. Instead, electrical characteristics of communication line 15 coupled to user equipment 32 are measured beforehand and stored in memory 60. These earlier electrical measurements may be made under controlled, known conditions or at times of known "safe" operation when it is certain that no surveillance devices are installed on communication line 15. Then, whenever a user desires to perform a communications security check, the electrical characteristics of communications line 15 are measured and then compared with those characteristics stored in memory 60. The comparison will readily determine whether a communications surveillance device has been installed on communications line 15.

Controller 40 synchronizes the operations of signalling device 24, main control switch 42, signal switch 44, measuring device 46, and memory 60 in accordance with a software program stored in controller 40. An example of such a software control program is depicted in FIG. 7.

Figure 7A:
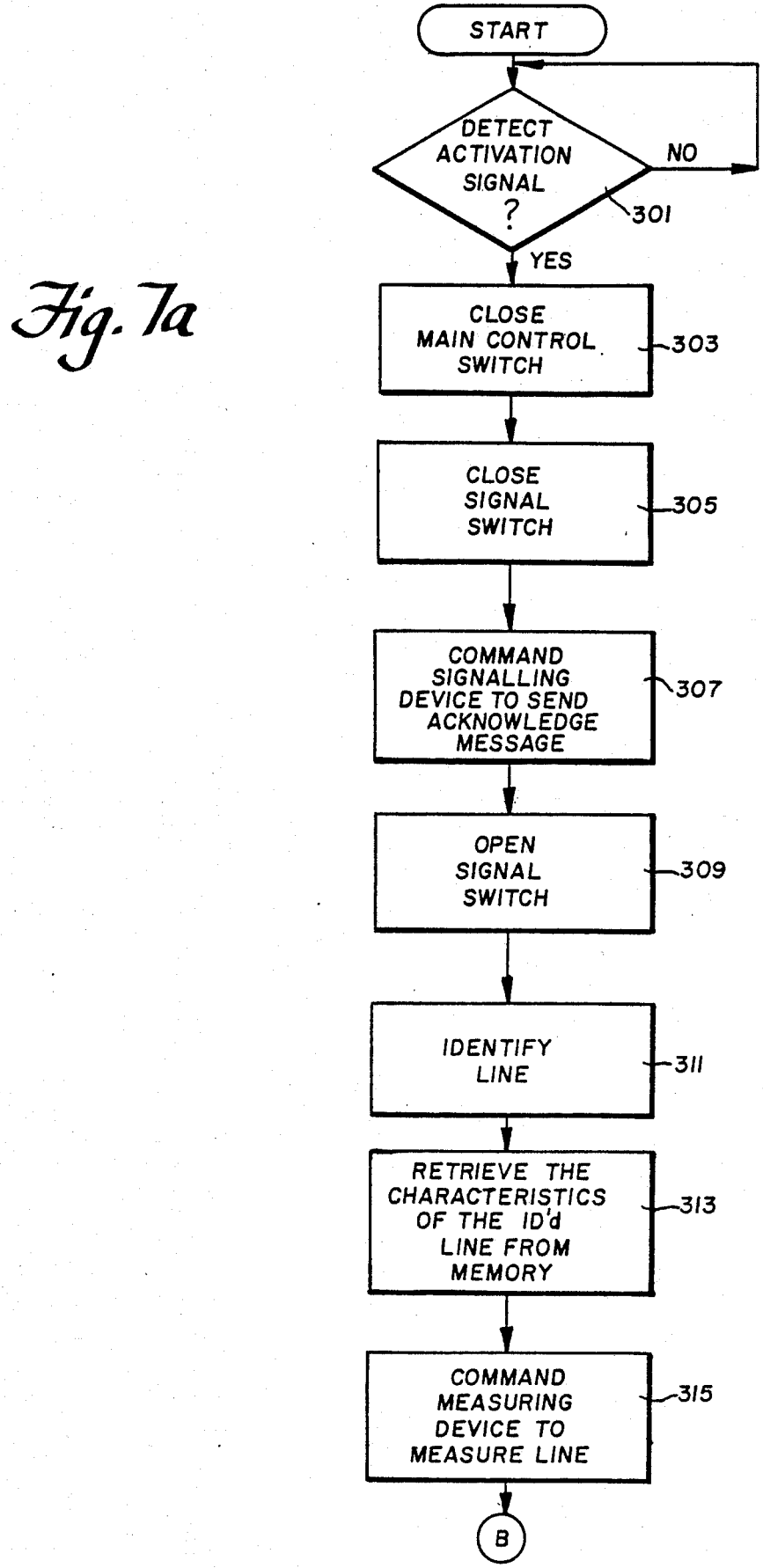
FIGS. 7a and b show a software flow chart of the second embodiment according to the present invention.
Figure 7B:
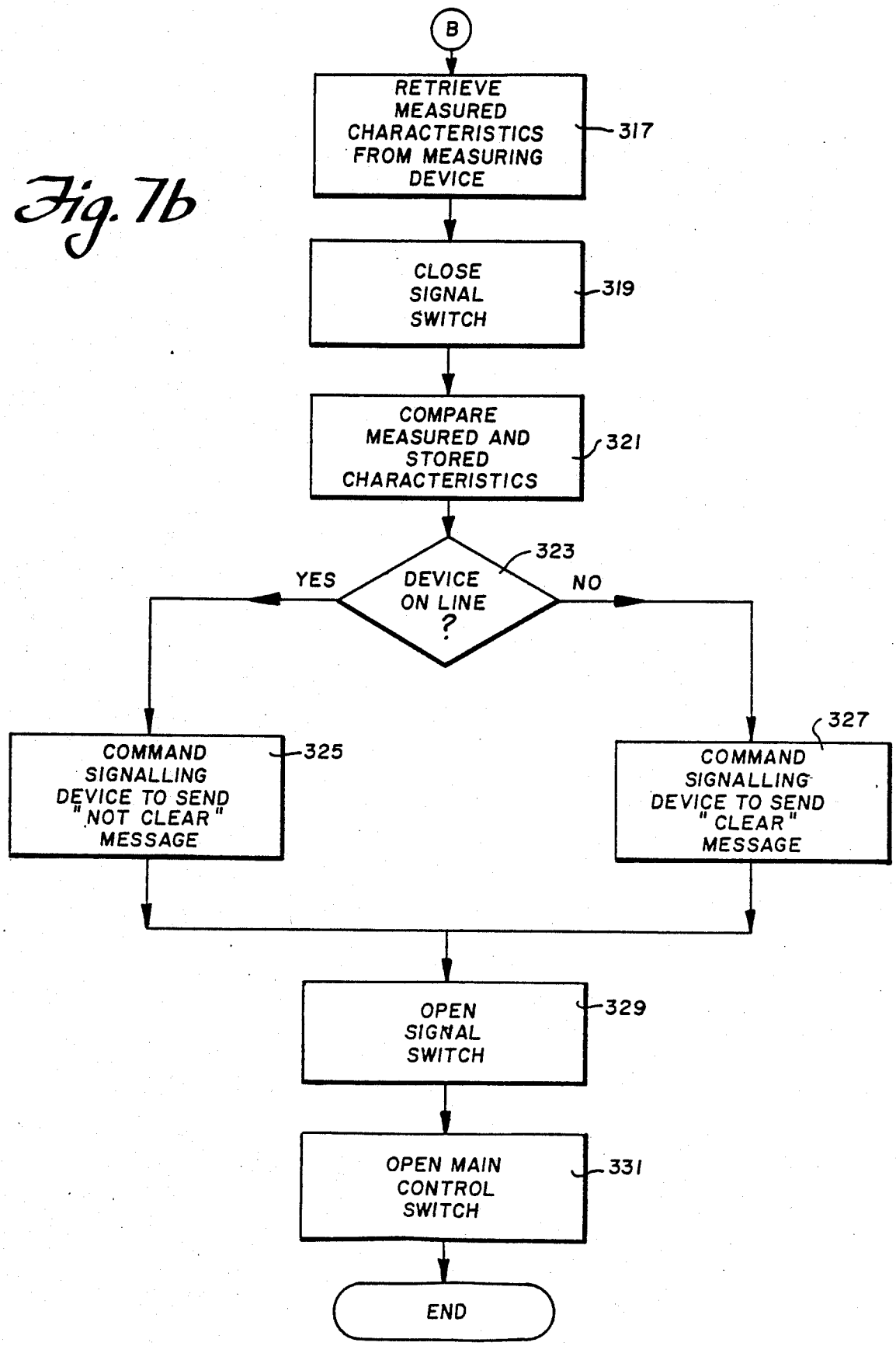

Referring simultaneously to FIGS. 6 and 7, controller 40 detects the activation signal from actuation control 20, at step 301. Then, controller 40 closes main switch 42 at step 303. Signal switch 44 is next closed at step 305. At step 307, controller 40 commands signalling device 24 to send an acknowledge message to communications line 15 through main control switch 42. Next, controller 40 opens the signal switch at step 309.

At step 311, controller 40 will identify which communications line it is desired to check. Then, at step 313 controller 40 retrieves from memory 60 the stored, measured, electrical characteristics of communications line 15. Measuring device 46 is now commanded to measure the same electrical characteristics of communications line 15, at step 315. Then, controller 40 retrieves the measured electrical characteristics from measuring device 46, at step 317. At step 319, controller 40 closes signal switch 44.

At step 321, controller 40 compares the measured electrical characteristics of communications line 15 with the stored electrical characteristics. Controller 40 thus can determine whether a surveillance device has been installed on line 15, at step 323.

If it is determined that there is a "bug" installed on communications line 15, controller 40 commands signalling device 24 to send a "not clear" message to communications line 15, at step 325. Alternatively, if controller 40 determines that there is no "bug" installed on communications line 15, controller 40 commands signalling device to send a "clear" message to communications line 15, at step 327. Thus, a user monitoring communications line 15 at user equipment 32 can readily determine whether or not a surveillance device is installed on communications line 15.

At step 329, controller 40 opens signal switch 44 to decouple signalling device 24 from communications line 15. Finally, at step 331, controller 40 opens main control switch 42 to recouple communications line 15 to central switching station equipment 12.

Thus, the security status of communications line 15 has been remotely determined without the need for additional equipment located at user terminal 30. Those having ordinary skill in this field will understand that many alternatives to the above-described embodiment may be designed without departing from the teachings of this application. For example, measuring device 46 may be able to measure electrical characteristics of communications line 15 without decoupling communications line 15 from central switching station equipment 12. Furthermore, comparison of the measured and stored electrical characteristics may be accomplished within measuring device 46 rather than in controller 40. These and other alternatives should be thought of as being included within the scope of the appended claims.

Thus, what has been described above is a method and apparatus for remotely determining the presence or absence of unauthorized surveillance devices installed on a communications line. Apparatus is installed at a central switching station and includes a measuring device for measuring electrical characteristics of the communications line, a signalling device for providing acknowledgment and status signals to the user, and a controller for synchronizing the various hardware within the apparatus. Once installed in a central control station, the present invention provides for quick and easy remote testing of any telephone line coupled to the central switching station. The communications test may be conducted directly to a user telephone, to a private branch exchange, or the telephone through a private branch exchange. Thus, a user may, at any time, quickly and inexpensively determine the communications security status of the telephone line between his telephone and a central switching station. Thus, such an apparatus and method is an integral part of a security system designed to provide communications security for land-line communications.

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims, which scope is to be accorded the broadest interpretations so as to encompass all such modifications and equivalent structures. For example, the present invention may be applicable to any telecommunications loops involving land-lines such as data, voice, digital or analog communications. Furthermore, the present invention has application in detecting any non-fault conditions on a communications line. Persons having ordinary skill in the telecommunications design field will readily recognize the advantages provided by the apparatus and method as claimed below.

What is claimed is:

1. Apparatus for remotely determining whether or not an unauthorized surveillance device is installed on a communications line between user terminal equipment and communications exchange station equipment, said apparatus is adapted to be responsive to a test request signal provided from a location remote from said exchange station, comprising:

receiving means located at said exchange station, adapted for receiving said test request signal;

measuring means, located at said exchange station and coupled to said receiving means, for measuring electrical characteristics of said communications line and determining whether or not a surveillance device is installed on said line between said user terminal equipment and said exchange station equipment, in response to said test request signal; and signalling means, located at said exchange station and coupled to said measuring means for generating a status signal indicating whether or not said device is installed on said line.

2. An apparatus according to claim 1 wherein said measuring means includes:

a measuring device for measuring said electrical characteristics and providing an output signal indicative of whether said device is installed on said line;

main switch means, coupled to said communications line, for switching said communications line from a first state where said line is coupled to said exchange station equipment, and a second state where said line is coupled to said measuring device; and control means for switching said main switch means to said first state when the measuring and determining is complete, and for switching said main switch means to said second state in response to said test request signal, and for controlling said signalling means in response to said output signal.

3. An apparatus according to claim 2 wherein said signalling means includes:

a signalling device, coupled to said control means, for generating said status signal in response to said output signal; and signal switch means, coupled to said signalling device and to said main switch means and controlled by said control means, for providing said status signal to said communications line when said control means receives said output signal.

4. An apparatus according to claim 3 further including receiver means, coupled to and colocated with said user terminal equipment, for placing said user terminal equipment in an off-loaded state.

5. An apparatus according to claim 4 wherein said controller provides an initiation signal to said measuring device to initiate the measuring of said electrical characteristics, and wherein said controller causes said signalling device to provide an off-load signal to said communications line.

6. An apparatus according to claim 5 wherein said receiver means includes:

terminal switch means, coupled to said communications line and to said user terminal equipment, for switching said communications line between a first terminal state where said communications line is connected to user terminal equipment, and a second terminal state where said communications line is off-loaded; and terminal receiver means, coupled to said communications line and to said terminal switch means, for switching said terminal switch means to said second terminal state in response to said off-loading signal, and for switching said communications line to said first terminal state when the measuring and determination of the communications line is complete.

7. An apparatus according to claim 2 wherein said control means includes a memory storing reference data regarding the electrical characteristics of said communications line, and wherein said measuring device compares the measured electrical characteristics with the stored reference characteristics to determine whether said device has been installed on said line.

8. An apparatus for remotely detecting the presence of a surveillance device on a communications line between user telephone equipment and a telephone central switching station, said apparatus adapted to be responsive to a test request signal provided by said user telephone equipment, comprising:

actuation control means, coupled to said telephone central switching station, adapted for receiving said test request signal, and for providing an activation signal;

a main control switch for switching said communications line between a test state where said communications line is uncoupled from said central switching station hardware, and a non-test state where said communications line is coupled to said central switching station hardware;

measuring means coupled to said main control switch for measuring electrical characteristics of said communications line when said communications line is in said test state, and for determining the presence of a surveillance device on said communications line from the measured electrical characteristics of said line, said measuring means providing output signals indicative of whether or not said device is installed on said line;

signalling means responsive to said output signal from said measuring means, for providing a status signal indicative of the presence/absence of said device on said line;

signal switch means coupled to said main switch means and to said signalling means, for providing said status signal to said communications line when the test is complete; and control means coupled to said actuation means and to said measuring means and to said signalling means, for controlling said main control switch in response to said activation signal, and for controlling said signal switch in response to said output signal from said measuring means.

9. An apparatus according to claim 8 wherein said control means includes memory means for storing reference data about electrical characteristics of said communications line between said telephone central switching station and said user telephone equipment.

10. An apparatus according to claim 9 wherein said measuring means compares measured electrical characteristics with the stored electrical characteristics to determine whether or not a device has been installed on said line.

11. An apparatus according to claim 8 further including:

user telephone equipment switching means coupled to said communications line for switching said communications line from a first configuration where said communications line is coupled to said user telephone, and a second configuration where said communications line is off-loaded; and user telephone equipment control means, coupled to said communications line for switching said user telephone equipment switching means between said first configuration and said second configuration.

12. An apparatus according to claim 11 wherein said signalling means provides an off-load signal to said communications line, and wherein said user telephone equipment control means switches said communications line to said second configuration upon receipt of said off-load signal.

13. A method for determining whether or not an unauthorized surveillance device is installed on a communications line between user terminal equipment and communications exchange station equipment, comprising the steps of:
   generating a test request signal requesting a test of said communications line, said test request signal being generated at a location remote from said exchange station;
   receiving, at said exchange station, said test request signal, and providing a test commence signal in response to said line scan request signal;
   measuring, at said exchange station, electrical characteristics of said communications line in response to said test commence signal;
   determining whether or not a surveillance device is installed on said line based on said measured electrical characteristics, and providing output signals indicative of the presence/absence of said device on said line; and
   signalling whether or not said device is installed on said line in response to said output signals.

14. A method according to claim 13 wherein said determining step includes the step of comparing the measured electrical characteristics with stored electrical characteristics to determine whether said device is installed on said line.

15. A method according to claim 13 wherein said measuring step includes the steps of:
   providing an off-load signal to said user terminal equipment;
   off-loading said terminal equipment in response to said off-load signal; and
   measuring said electrical characteristics of the communications line when said user terminal equipment has been off-loaded.

16. Apparatus for remotely detecting the presence of an eavesdropping device on a communications line between user equipment and a communications line exchange station, said apparatus adapted to receive a test request signal from a location remote from said exchange station, comprising:
   means for receiving said test request signal and providing an actuation signal in response to said test request signal, said receiving means being located at said exchange station;
   measuring means, coupled to said exchange station, for measuring electrical characteristics of said communications line between said user equipment and said exchange station in response to said activation signal;
   controller means, coupled to said measuring means, for controlling said measuring device, and for determining whether said eavesdropping device is installed on said line based on the electrical characteristics measured by said measuring means, and for providing an output signal indicative of the presence or absence of said device on said line; and
   signalling means, coupled to said controller means, for providing a status signal indicating the security status of said communications line in response to said output signal from said controller means.

17. Apparatus according to claim 16 wherein said controller means includes a memory storing reference electrical characteristics of said communications line, and wherein said controller means determines whether or not said device is on said line by comparing the stored reference characteristics with the measured characteristics.

18. Apparatus according to claim 17 further including main control switch means, coupled to said exchange station and to said communications line and controlled by said controller means, for switching said communications line from a first state where said line is connected to said exchange station to a second state where said line is decoupled from said exchange station and coupled to said measuring means.

19. Apparatus according to claim 18 wherein said controller means provide a begin test signal to said signalling means in response to said activation signal, and wherein said signalling means provides an off-load signal to said communications line in response to said begin test signal, and further including:
   user equipment switch means, coupled to said communications line and located with said user equipment for switching said communications line between a first configuration where said line is connected to said user equipment and a second configuration where said user equipment is decoupled from said line; and
   user receiver means for controlling said user equipment switch means in accordance with said off-load signal.

* * * * *